D. Custer,
Grain Drill,

Nº 6,866. Patented Nov. 13, 1849.

Inventor;
D. Custer

UNITED STATES PATENT OFFICE.

DANIEL CUSTER, OF CHAMBERSBURG, PENNSYLVANIA.

IMPROVEMENT IN SEED-DRILLS.

Specification forming part of Letters Patent No. 6,866, dated November 13, 1849.

*To all whom it may concern:*

Be it known that I, DANIEL CUSTER, of Southampton township, in the county of Franklin and State of Pennsylvania, have invented a new and useful improvement on a machine commonly called a "grain-drill," which enables me to sow wheat, rye, oats, barley, rice, and cotton; and I do hereby declare the following to be a full and exact description of the same.

To enable others to make and use my invention, I will proceed to describe its construction and operation, reference being had to the annexed drawings, making a part of this specification.

Figure 1:
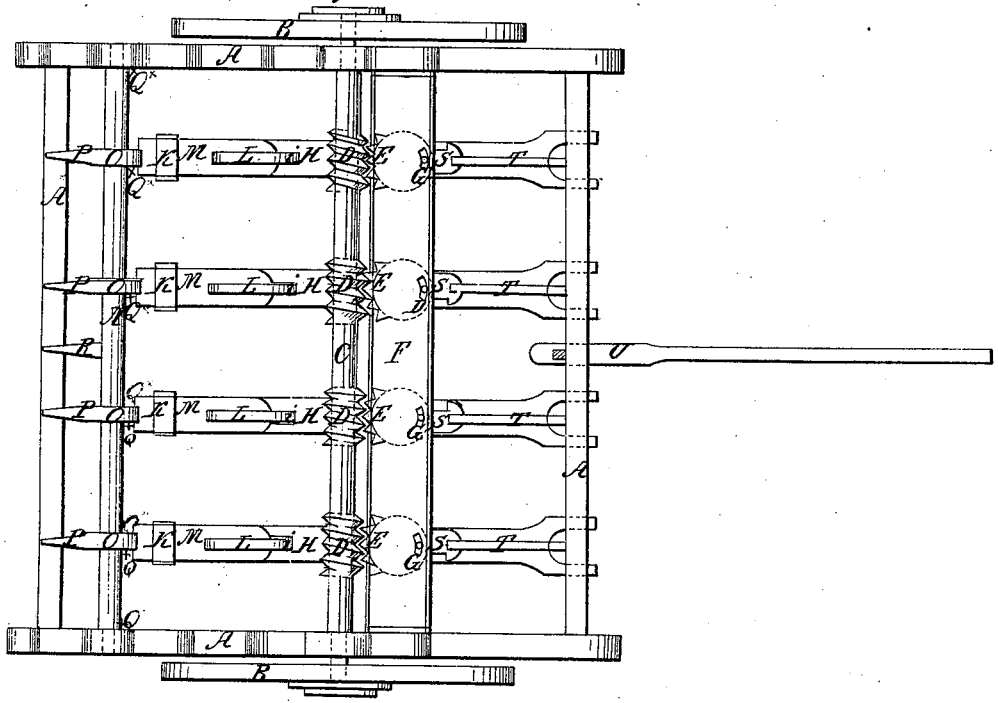
Figure 2:
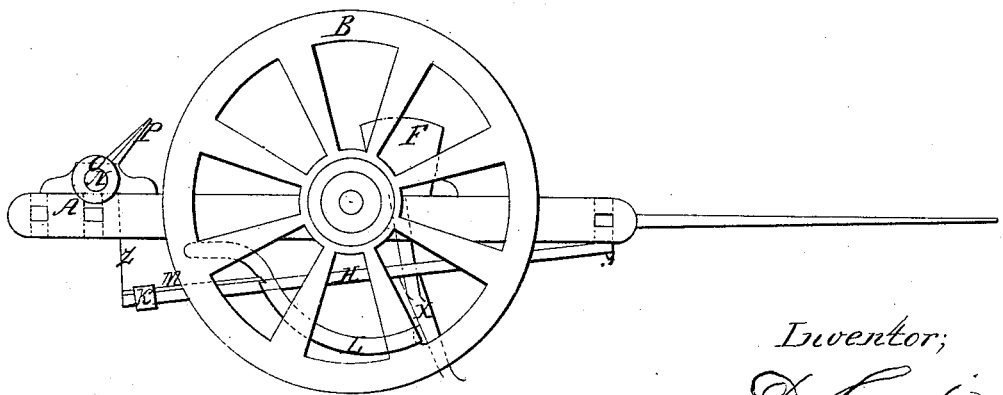

Figure 1 is a top view. Fig. 2 is a side view.

I shall in the first place endeavor to explain the top view.

In the first place, A is the frame; B, the wheels on the axle; C, the axle; D, a screw or worm on the axle; E, a notch-wheel; F, the hopper; G, the hole in the upper bottom of the hopper; H, the boot-carrier; I, the mortise in the boot-carrier; K, a slide on the spring; L, the brace; M, the spring; N, a roller; O, a pulley; P, the handle of the pulley; Q, the pins in the pulley; R, the handle of the roller; S, the slide; T, a top lever; U, the tongue.

The foregoing letters are represented in top view, Fig. 1, the following in side view, Fig. 2.

X is the boot; Y, the bolts that fasten the carrier; Z, the strap or chain that connects the pulley and carrier.

D is the screw or worm on the axle that gears into the notch-wheel E, which is placed in the bottom of the hopper F, the bottom of said hopper being double. These bottoms are placed so far apart as to receive the notch-wheels between them, between each of which a small cast-iron division is placed, so as to keep them at regular distances from each other, these divisions being sufficiently high to permit the said notch-wheels to work freely. These notch-wheels have mortises to carry the grain round. The wheels revolve in a horizontal position between the two bottoms. The upper bottom of hopper F, which extends over the notch-wheels E, has holes cut through it exactly over the mortises in the notch-wheels, and the grain lying immediately on said bottom will drop through into the mortises in the notch-wheels, and is conveyed or carried round to the opposite side to where there is a hole cut through the lower bottom, which lets the grain drop into the iron boots or shovels X, which are hollow. These receive the grain and convey it to the ground and bury it as deep as the operator chooses. This he can do by lowering or raising the boot-carrier H, the one end of which is attached to the lower part of the front rail of the frame A by two bolts, which are stationary in the frame. The boot-carrier works loosely on the bolts by the use of long mortises, which enables me to spread the boots so as to straddle a large stone or stump. The boots are fastened to the carrier by means of iron straps or hooks, the boots having ears on each side at the upper end, and those straps or hooks that extend over the ears of the boots run through the carrier H on each side of the hole that lets the grain into the cast-iron boots or shovels and fasten the boots to the carrier in such a manner as to prevent the boots to spring back against the carrier, which enables me to drive over very large stumps or stones. These boots or shovels are kept in their proper position by the brace L, which connects the boot opposite the bearing side by means of ears cast on the boot, so as to form a mortise where the brace L is fastened by a bolt. The brace has a shoulder cut on it just as high as the top side of the boot-carrier when the boot stands in its proper position. The springs M, that are fastened on the top of the carrier at the extreme back end by a pin, and run over this shoulder, that is cut into the brace L at the other end, and is kept down by slide K, moves over the carrier and spring, which enables the operator to make said springs stronger or weaker by moving the slide closer to the mortise I or farther off, if he desires it. The brace is cut in such a manner as to hold on and keep the slide in its place until it raises the spring M up a considerable distance before the spring lets the brace go. This occurs when the boot meets with any greater resistance than is met with in ordinary tillage. The spring will not yield until it is borne up sufficiently far to let the shoulder out from under it, which it does by its peculiar shape. Then the boot will fly back and up against the carrier H. If the obstacle is still too high, the carrier will press upward a considerable distance, which enables me to pass over high stumps or stones. After the machine has passed over the obstacle the boot will fall back again to its place.

The parts O are circular pulleys with a lever attached to them. These pulleys have a hole in the center large enough to slip over the roller N, one being fixed on each boot-carrier, with the strap or chain fastened to the end of the carrier and the other end to the pulley O. Then, in case the operator desires to raise or lower one boot at a time, he takes hold of the lever P, which turns the pulleys (these turn on the roller N) and winds up the chains and runs the boot out of the ground. If he wishes to keep it up, he will slip a bridle over the end of the lever P, the bridle being fastened to the frame A, and by letting the lever go the pulley will run back to its rest, which is made by a small iron pin, Q, in the roller N and another in the side of the pulley O, which rests on the one that is in the roller and stops the carrier from dropping lower at one time than at another, the carrier being hung lower or higher by strap or chain which connects the two together.

It is also necessary to have all the boots or shovels out of the ground at the end of the field when the operator turns round or when he desires to convey the machine from one place to another. In either of these cases the operator draws up the roller N by turning down the lever R, which raises all the carriers at the same time, and when he has turned round at the end he lets the lever R go, and all the boots or shovels fall to their places again.

It is also necessary to have the machine to stop sowing at the end when the operator turns round. This is done by slides S. These slide out and in under the extreme bottom of the hopper F. By shoving this slide in it covers the aperture in the extreme bottom of hopper F and stops the grain from discharging; but it is carried round in the mortises and receives no more until it commences discharging again. The stopping of the grain is done by lever T, which is cut somewhat in the shape of the letter L. The one end is mortised into the frame A in such a manner as to let it work up and down. The end X rests against the slide S, which is sheared open, and receives the lever T. This keeps it from getting out of place at X. The L end of the lever runs down and rests on the carrier, and when the carrier is raised it also raises this lever, it being stationary at the end W, and only rises at X. It is cut in such a manner as you raise it, and it pushes the slide S in over the discharge-hole, which stops the grain from discharging. When the carrier is let down this lever drops and the slide S comes back, and the grain again enters the boot or shovel, which deposits it in the ground.

I have now given a description of the top view, and shall proceed to give an explanation of the side view. In this view I will only refer by letters to those parts that could not be shown in the top view. In the first place, X represents the iron boots or shovels that carry to, deposit, and cover the seed in the ground; Y, the bolts that connect the boot or shovel-carrier H to the frame; A, front end of the machine; Z, the chain or strap that connects the carrier H to the pulley O.

What I claim, and desire to secure by Letters Patent, is—

The controlling of the springs M by means of the ring K, in the manner and for the purpose herein set forth.

D. CUSTER.

Witnesses:
H. C. KEYSER,
BENJ. KEYSER.